United States Patent
Qian et al.

(10) Patent No.: US 12,277,801 B2
(45) Date of Patent: Apr. 15, 2025

(54) GESTURE RECOGNITION METHOD, DEVICE AND COMPUTER-READABLE STORAGE MEDIUM

(71) Applicant: UBTECH ROBOTICS CORP LTD, Shenzhen (CN)

(72) Inventors: Chenghao Qian, Shenzhen (CN); Miaochen Guo, Shenzhen (CN); Jun Cheng, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 518 days.

(21) Appl. No.: 17/566,734

(22) Filed: Dec. 31, 2021

(65) Prior Publication Data

US 2022/0189208 A1   Jun. 16, 2022

Related U.S. Application Data

(63) Continuation of application No. PCT/CN2020/135081, filed on Dec. 10, 2020.

(51) Int. Cl.
*G06T 7/73* (2017.01)
*G06F 3/01* (2006.01)
(Continued)

(52) U.S. Cl.
CPC .............. *G06V 40/20* (2022.01); *G06F 3/017* (2013.01); *G06T 11/20* (2013.01); *G06V 10/82* (2022.01); *G06T 2210/12* (2013.01)

(58) Field of Classification Search
CPC ........ G06V 40/20; G06V 10/82; G06V 40/28; G06F 3/017; G06F 3/0304; G06T 11/20; G06T 2210/12
See application file for complete search history.

(56) References Cited

U.S. PATENT DOCUMENTS 10,241,588 B1 *   3/2019   Misra ..................... G06T 19/006
10,721,394 B1 *   7/2020   Korrapati ............... H04N 23/69
(Continued)

FOREIGN PATENT DOCUMENTS

| CN | 107808143 A | 3/2018 |
| CN | 109670452 A | 4/2019 |

OTHER PUBLICATIONS

English translation of ISR for PCT/CN2020/135081.
(Continued)

*Primary Examiner* — Siamak Harandi
*Assistant Examiner* — Mehrazul Islam (57) ABSTRACT

A gesture recognition method includes: acquiring a target image containing a gesture to be recognized; inputting the target image to a gesture recognition model that has a first sub-model, a second sub-model, and a third sub-model, the first sub-model is to determine a gesture category and a gesture center point, the second sub-model is to determine an offset of the gesture center point, and the third sub-model is to determine a length and a width of a bounding box for the gesture to be recognized; acquiring an output result from the gesture recognition model, the output result includes the gesture category, the gesture center point, and the offset of the gesture center point, and the length and the width of the bounding box; and determining the gesture category and a position of the bounding box of the gesture to be recognized according to the output result.

17 Claims, 7 Drawing Sheets

(51) Int. Cl.
*G06T 7/11* (2017.01)
*G06T 7/55* (2017.01)
*G06T 11/20* (2006.01)
*G06V 10/82* (2022.01)
*G06V 40/20* (2022.01)

(56) References Cited

U.S. PATENT DOCUMENTS

| | | | |
|---|---|---|---|
| 2012/0154557 A1* | 6/2012 | Perez | G06F 3/017 |
| | | | 348/E13.001 |
| 2019/0213406 A1* | 7/2019 | Porikli | G06V 20/597 |
| 2020/0159647 A1* | 5/2020 | Puszkiewicz | G06F 11/3664 |
| 2020/0409469 A1* | 12/2020 | Kannan | G06Q 50/20 |
| 2021/0012145 A1* | 1/2021 | Chaudhari | G06V 30/19167 |
| 2021/0294423 A1* | 9/2021 | Zhou | G06F 3/0304 |

OTHER PUBLICATIONS

English translation of Written opinions of ISA for PCT/CN2020/135081.
ISR for PCT/CN2020/135081.
Written opinions of ISA for PCT/CN2020/135081.

\* cited by examiner

GESTURE RECOGNITION METHOD, DEVICE AND COMPUTER-READABLE STORAGE MEDIUM

CROSS REFERENCE TO RELATED APPLICATIONS

The present application is a continuation-application of International Application PCT/CN2020/135081, with an international filing date of Dec. 10, 2020, the contents of all of which are hereby incorporated by reference.

BACKGROUND

I. Technical Field

The present disclosure generally relates to computer vision technologies, and particularly to a hand gesture recognition method and device.

2. Description of Related Art

With the rapid development of artificial intelligence (AI) technology, the methods of human-computer interaction have been greatly expanded. Gesture interaction is the one widely used method in human-computer interaction. Different hand gestures can be used to convey different instructions. Gesture recognition can be divided into three categories: the first one is to recognize hand gestures based on images; the second one is to recognize hand gestures using wearable devices (such as gloves); and the last one is to recognize hand gestures using voltage signals generated by physiological signals. The image-based recognition approach has become a focus of attention because it does not require additional dedicated equipment (e.g., the gloves).

Many conventional image-based gesture recognition methods typically use a complex model, and the calculation speed is slow, making it difficult to meet strict real-time requirements in certain application scenarios.

Therefore, there is a need to provide a method and device to overcome the above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views. Obviously, the drawings in the following description are only some embodiments of the present disclosure. For those of ordinary skill in the art, other drawings can be obtained based on these drawings without creative labor.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 1:
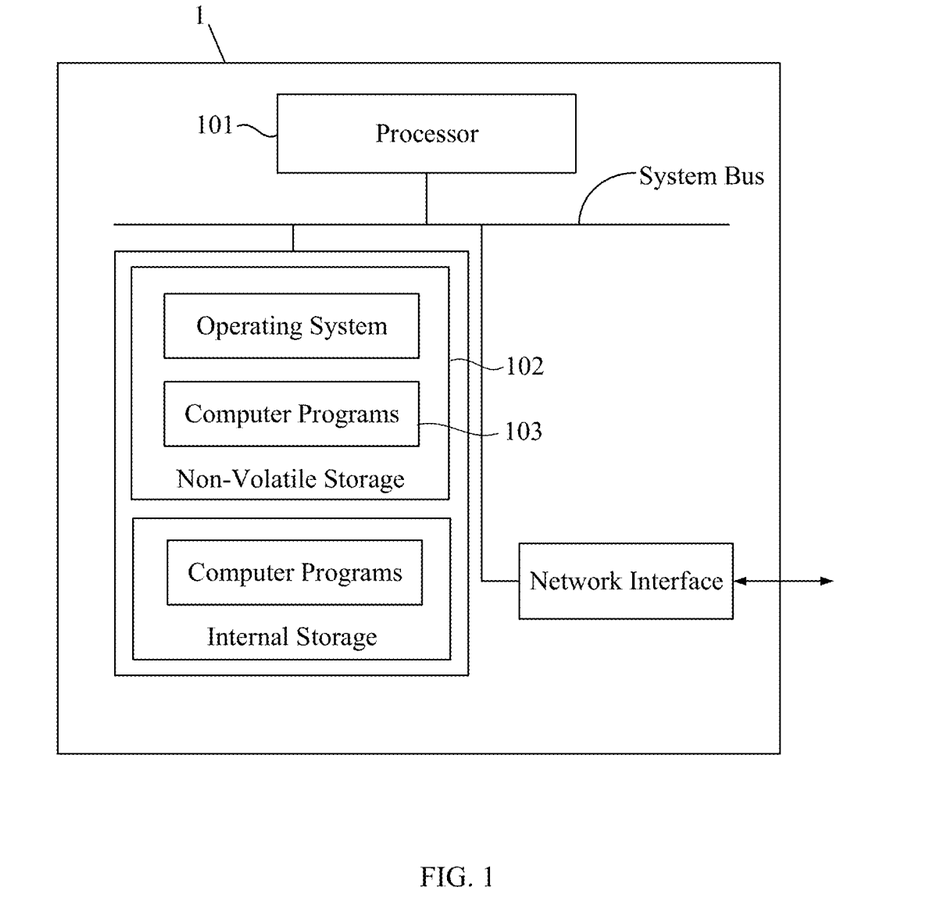
FIG. 1 is a schematic block diagram of a device for recognizing a hand gesture according to one embodiment.
Figure 5:
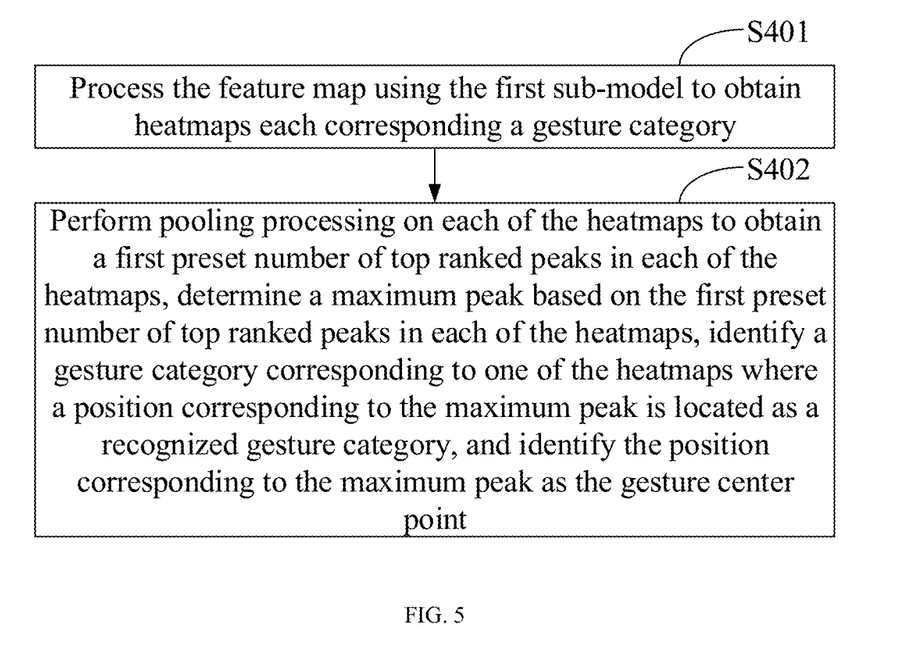
FIG. 5 is a flowchart of determining a gesture category and a gesture center point using the first sub-model according to one embodiment.

FIG. 1 shows a schematic block diagram of a hand gesture recognition device 1 according to one embodiment. The device 1 may include a processor 101, a storage 102, and one or more executable computer programs 103 that are stored in the storage 102. The processor 101 is electrically connected to the storage 102, and performs corresponding operations by executing the executable computer programs 103 stored in the storage 102. When the processor 101 executes the computer programs 103, the steps in the embodiments of the method for controlling the device 1, such as steps S101 to S104 in FIG. 2 and steps S401 to S402 in FIG. 5 are implemented. In one embodiment, the device 1 may be a client or a remote server equipping with NVIDIA Jetson Nano developer kit.

The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 102 may be an internal storage unit of the device 1, such as a hard disk or a memory. The storage 102 may also be an external storage device of the device 1, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the device 1. The storage 102 can also be used to temporarily store data that have been output or is about to be output.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the device 1.

Figure 2:
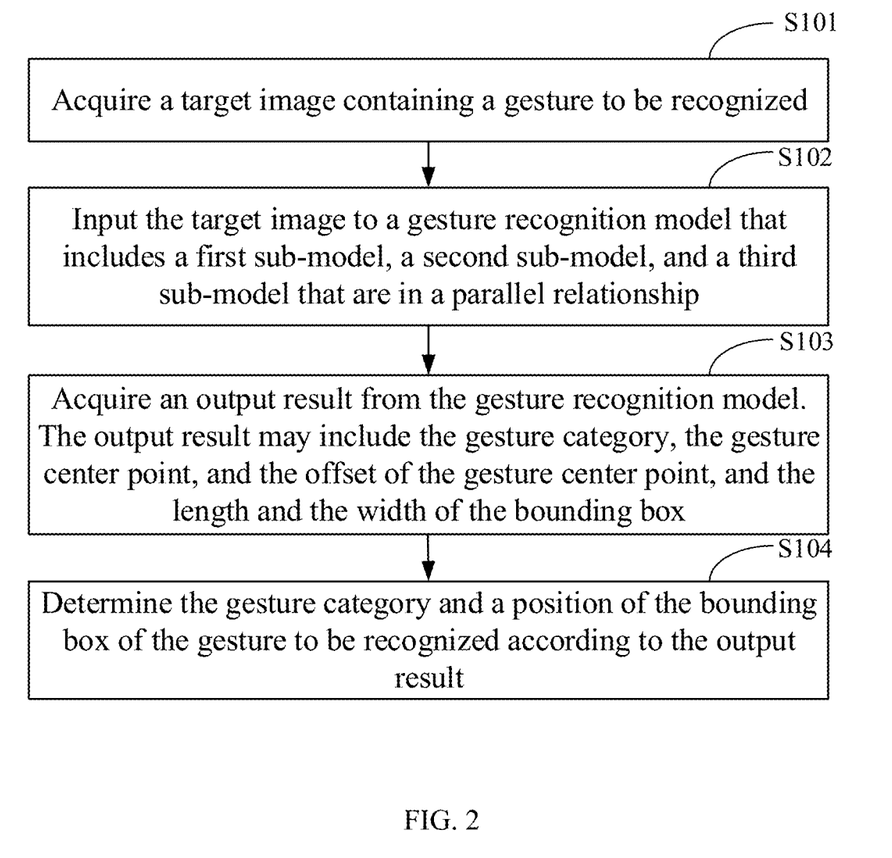
FIG. 2 is a schematic flowchart of a hand gesture recognition method according to one embodiment.

FIG. 2 shows an exemplary flowchart of a hand gesture recognition method according to one embodiment. The method can be implemented to control the device 1 shown in FIG. 1. It should be noted that the method may also implemented in a remote server. In one embodiment, the method may include steps S101 to S104.

Step S101: Acquire a target image containing a gesture to be recognized.

In one embodiment, the target image may be an original image directly captured by a camera. The target image can also be an image obtained after the original image is preprocessed. In one embodiment, the device 1 may include a monocular camera that is to capture the original image that is an RGB image. The original image is processed to create the target image of a preset size.

Step S102: Input the target image to a gesture recognition model that includes a first sub-model, a second sub-model, and a third sub-model that are in a parallel relationship. The first sub-model is to determine a gesture category and a gesture center point, the second sub-model is to determine an offset of the gesture center point, and the third sub-model is to determine a length and a width of a bounding box for the gesture to be recognized.

In one embodiment, after the target image is inputted into the gesture recognition model, feature extraction is performed on the target image to obtain a feature map. The feature map will be inputted into the three sub-models. The three sub-models can process the feature map in parallel and perform different processing tasks respectively, which is conducive to improving of the speed of gesture recognition.

The first sub-model is to determine the gesture category and the gesture center point. The recognition of the gesture center point is to determine the position of a gesture. The second sub-model is to determine an offset of the gesture center point. In order to improve the calculation speed, the processing of the target image inputted into the gesture recognition model will involve down-sampling, which causes the position of the labeled gesture center point to be biased due to discrete data. It is thus necessary to determine the offset of the gesture center. The third sub-model is to determine the length and width of the bounding box for the gesture to be recognized. For gesture recognition, it is not only necessary to determine the type of gesture in an image, but also to determine the position of the gesture in the image. In the case when there are multiple gestures in an image, it is necessary to determine the position and category of each gesture. By determining the length and width of the bounding box while taking into consideration the center point of the gesture, the position of the gesture can be accurately determined.

Step S103: Acquire an output result from the gesture recognition model. The output result may include the gesture category, the gesture center point, and the offset of the gesture center point, and the length and the width of the bounding box.

Figure 3:
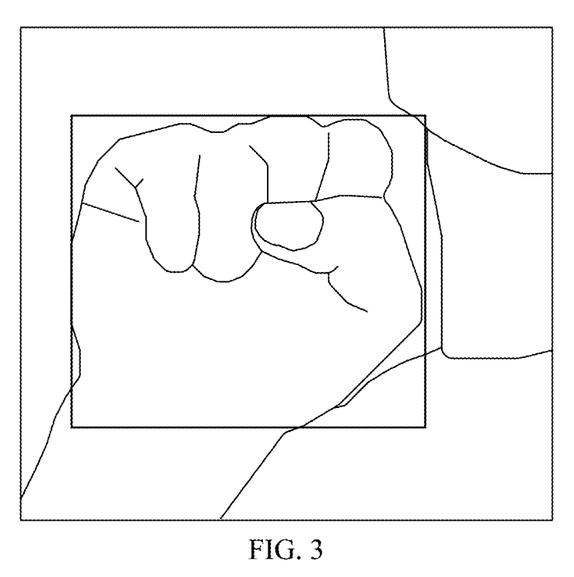
FIG. 3 is a schematic diagram of a bounding box surrounding a hand gesture.

The output result of the gesture recognition model actually includes the output results of the three sub-models, including: the gesture category and the gesture center point output by the first sub-model, the offset of the gesture center point output by the second sub-model, and the length and width of the bounding box output by the third sub-model. The bounding box indicates the position of the gesture, that is, the position of the gesture can be determined based on the bounding box. An exemplary bounding box positioning a hand gesture is shown in FIG. 3.

Step S104: Determine the gesture category and a position of the bounding box of the gesture to be recognized according to the output result.

In one embodiment, the coordinates of the four corners of the bounding box can be calculated according to the gesture center point and the offset of the gesture center point, and the length and the width of the bounding box of the output result, that is, the position of the bounding box is determined. The category of the gesture to be recognized is the category of the output result, and is the final gesture category recognized. The recognized gesture and the position of the bounding box are shown in FIG. 3.

In one embodiment, the special reasoning framework TensorRT can be used for reasoning. That is, the gesture category and the position of the bounding box are obtained by reasoning based on the output result. Since TensorRT only accepts ONNX models as input, it is necessary to convert the gesture recognition model to an ONNX model.

By implementing the method described in the embodiment above, the speed and accuracy of gesture recognition can be improved. In addition, the gesture recognition method above does not require a complicated calculation process, and is suitable for deployment on clients.

In one embodiment, the gesture recognition model may further include a feature extracting sub-model that is to perform feature extraction on the target image to obtain a feature map, and input the feature map to the three sub-models.

Figure 4:
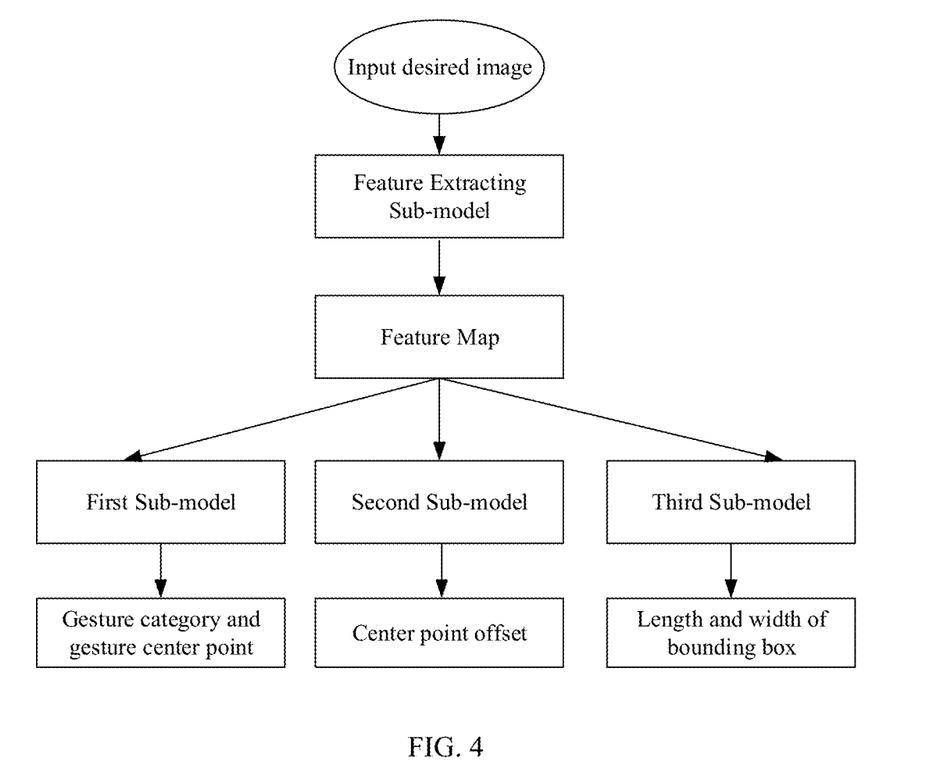
FIG. 4 is a schematic diagram of a recognition process of a gesture recognition model according to one embodiment.

The feature extracting sub-model is to extract the features from the target image to obtain the feature map, and the feature extraction is implemented by using a convolutional neural network. In one embodiment, in order to ensure the real-time performance of gesture recognition, the feature extracting sub-model is implemented using a lightweight network. For example, it can be implemented using Mobile-NetV2, which can ensure real-time performance while ensuring accuracy. FIG. 4 shows a schematic diagram of the recognition process of the gesture recognition model according to one embodiment. Specifically, first, the feature extracting sub-model extracts the feature map according to the input target image. After the feature map is extracted, it is used as the input of the three sub-models. The first sub-model, the second sub-model, and the third sub-model can all be implemented using a convolutional neural network model. The first sub-model is to determine a gesture category and a gesture center point based on the feature map. The second sub-model is to determine the offset of the gesture center point based on the feature map. The third sub-model is used to determine the length and width of the bounding box based on the feature map.

Referring to FIG. 5, in one embodiment, the method may further include the following steps after the feature map is inputted to the first sub-model.

Step S401: Process the feature map using the first sub-model to obtain heatmaps each corresponding a gesture category.

The first sub-model may include multiple convolutional layers, and the convolutional layers are to perform further feature extraction on the feature map, and finally a heatmap corresponding to each gesture category is obtained. For example, if there are 18 gesture categories in total, 18 heatmaps corresponding to the 18 gesture categories will be obtained.

Step S402: Perform pooling processing on each of the heatmaps to obtain a first preset number of top ranked peaks in each of the heatmaps, determine a maximum peak based on the first preset number of top ranked peaks in each of the heatmaps, identify a gesture category corresponding to one of the heatmaps where a position corresponding to the maximum peak is located as a recognized gesture category, and identify the position corresponding to the maximum peak as the gesture center point.

Pooling is to reduce the dimensionality and retain the main characteristics. Through the maximum pooling process, the peaks on each heatmap are selected. The point has a maximum value among 8 points neighboring a specified point can be selected the peak point. Take a 3×3 image expressed in a matrix form $$\begin{bmatrix} 3 & 3 & 1 \\ 2 & 4 & 5 \\ 5 & 6 & 2 \end{bmatrix}$$

as an example. When the point with value 4 is selected as the specified point, the point with the maximum value 6 among the 8 neighboring points will be retained after pooling. After that, the 3×3 image will be expressed in matrix form $$\begin{bmatrix} 0 & 0 & 0 \\ 0 & 0 & 0 \\ 0 & 6 & 0 \end{bmatrix}.$$

The selected "peak" points will be arranged in order of magnitude of values, and the top-ranked 100 "peak" points will be retained. The gesture category corresponding to the heatmap where the point with maximum peak is located is selected as the recognized gesture category, and the point with maximum peak is determined as the center point of the recognized gesture.

In one embodiment, training the gesture recognition model may include the following steps: obtain a training data set that includes training images containing gestures and labels corresponding to the gestures in the training images and configured to determine desired outputs of the gesture recognition model, each of the labels includes a gesture category and coordinates of a bounding box; input the training images to the gesture recognition model, obtain actual outputs of the three sub-models of the gesture recognition model, and calculate a loss value according to the actual outputs and the desired outputs using a loss function; and update a weight in the gesture recognition model according to the loss value using a back propagation algorithm so as to reduce the loss value until convergence is reached.

The training of the gesture recognition model adopts a supervised training approach. Specifically, a training data set contains training images and labels of gestures in the training images is first obtained. Each of the labels includes a gesture category and coordinates of a bounding box. According to the coordinates of the bounding box, the position of the center point of the gesture and the length and width of the bounding box can be determined. The desired output may include: a desired output center point of the gesture, and desired output length and width of the bounding box.

The loss function is used to calculate the loss value between the actual output and the desired output, and then the weight in the gesture recognition model is updated according to the loss value using the backpropagation algorithm, which allows the loss value to decrease until convergence is reached. After that, the training of the gesture recognition model is completed.

In one embodiment, determining the gesture category and the position of the bounding box of the gesture to be recognized according to the output result may include: calculate a target gesture center point according to the gesture center point, and the offset of the gesture center point; and calculate the position of the bounding box according to the target gesture center point and the length and the width of the bounding box.

Specifically, according to the output of the first sub-model, a preliminary predicted position of the gesture center point (x1, y1) can be obtained. According to the second sub-model, an offset (a, b) can be obtained. The coordinates of the gesture center point can thus be obtained, i.e., (x1+a, y1+b). According to the third sub-model, the length and width (w, h) of the bounding box can be obtained. Accordingly, the coordinates of the lower left corner of the entire bounding box are (xw/2, yh/2), and the coordinates of the upper right corner are (x+w/2, y+h/2), and the bounding box can be drawn based on the two points, thus positioning the gesture.

In one embodiment, acquiring the target image containing the gesture to be recognized may include: obtain an original RGB image containing the gesture to be recognized using a camera; and preprocess the original RGB image to obtain the target image of a preset size.

In the embodiment, the requirements for hardware are not high because the RGB image can be captured by a monocular camera. Preprocessing the image refers to processing the image to a standard size. For example, the image can be uniformly processed to a size of 512×512. Specifically, after the original image is obtained, it is converted into a size of 512×512 through affine transformation under the premise of maintaining the flatness of the image.

Figure 6:
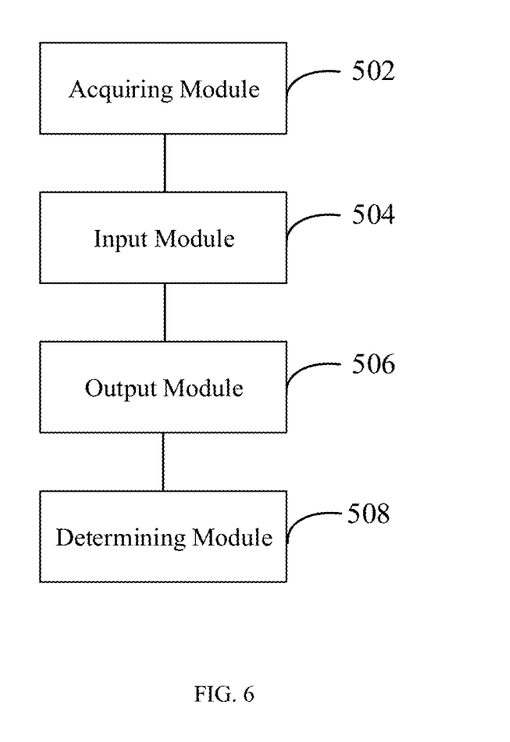
FIG. 6 is a schematic block diagram of a gesture recognition device according to one embodiment.

Referring to FIG. 6, in one embodiment, a gesture recognition device may include an acquiring module 502, an input module 504, an output module 506, and a determining module 508. The acquiring module 502 is to acquire a target image containing a gesture to be recognized. The input module 504 is to input the target image to a gesture recognition model that includes a first sub-model, a second sub-model, and a third sub-model that are in a parallel relationship. The first sub-model is to determine a gesture category and a gesture center point, the second sub-model is to determine an offset of the gesture center point, and the third sub-model is to determine a length and a width of a bounding box for the gesture to be recognized. The output module 506 is to acquire an output result from the gesture recognition model. The output result includes the gesture category, the gesture center point, and the offset of the gesture center point, and the length and the width of the bounding box. The determining module 508 is to determine the gesture category and a position of the bounding box of the gesture to be recognized according to the output result.

In one embodiment, the gesture recognition model may further include a feature extracting sub-model that is to perform feature extraction on the target image to obtain a feature map, and input the feature map to the three sub-models.

In one embodiment, the method may further include, after the feature map is inputted to the first sub-model, processing the feature map using the first sub-model to obtain heatmaps each corresponding to a gesture category; and performing pooling processing on each of the heatmaps to obtain a first preset number of top ranked peaks in each of the heatmaps, determining a maximum peak based on the first preset number of top ranked peaks in each of the heatmaps, identifying a gesture category corresponding to one of the heatmaps where a position corresponding to the maximum peak is located as a recognized gesture category, and identifying the position corresponding to the maximum peak as the gesture center point.

Figure 7:
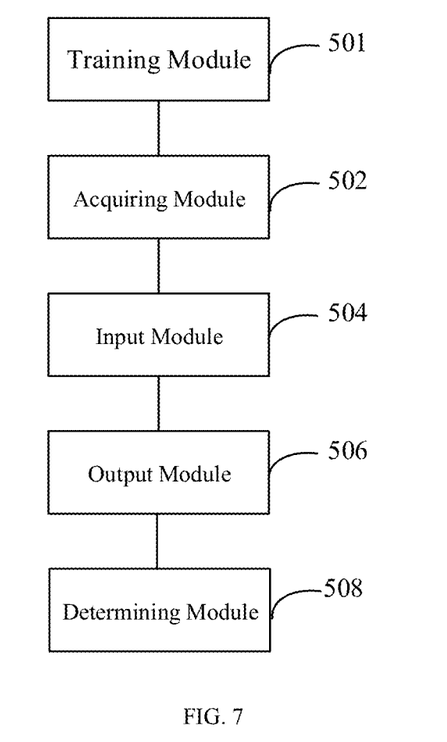
FIG. 7 is a schematic block diagram of a gesture recognition device according to another embodiment.

Referring to FIG. 7, in one embodiment, the gesture recognition device may further include a training module 501. The training module 501 is to: obtain a training data set that includes training images containing gestures and labels corresponding to the gestures in the training images and configured to determine desired outputs of the gesture recognition model, each of the labels includes a gesture category and coordinates of a bounding box; input the training images to the gesture recognition model, obtain actual outputs of the three sub-models of the gesture recognition model, and calculate a loss value according to the actual outputs and the desired outputs using a loss function; and update a weight in the gesture recognition model according to the loss value using a back propagation algorithm so as to reduce the loss value until convergence is reached.

In one embodiment, the determining module is further to: a target gesture center point according to the gesture center point, and the offset of the gesture center point; and calculate the position of the bounding box according to the target gesture center point and the length and the width of the bounding box.

In one embodiment, acquiring the target image containing the gesture to be recognized may include: obtaining an original RGB image containing the gesture to be recognized using a camera; and preprocessing the original RGB image to obtain the target image of a preset size.

In one embodiment, the feature extracting sub-model is implemented using a lightweight network.

For concepts, explanations, and detailed descriptions related to the technical solution provided by this embodiment of the present disclosure, used in the device, refer to descriptions about the content in the foregoing method or other embodiments. Details are not described again herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented gesture recognition method, comprising:
   acquiring a target image containing a gesture to be recognized;
   inputting the target image to a gesture recognition model that comprises a first sub-model, a second sub-model, and a third sub-model that are in a parallel relationship, the first sub-model configured to determine a gesture category and a gesture center point, the second sub-model configured to determine an offset of the gesture center point, and the third sub-model configured to determine a length and a width of a bounding box for the gesture to be recognized, wherein the offset of the gesture center point is caused by the gesture recognition model processing the target image, and wherein the target image is inputted to the first sub-model, the second sub-model and the third sub-model, and the first sub-model, the second sub-model and the third sub-model process the target image in parallel;
   acquiring an output result from the gesture recognition model, wherein the output result comprises the gesture category, the gesture center point, and the offset of the gesture center point, and the length and the width of the bounding box; and
   determining the gesture category and a position of the bounding box of the gesture to be recognized according to the output result;
   wherein the gesture center point and the length and the width of the bounding box are configured for determining a position of a gesture. determining the gesture category and the position of the bounding box of the gesture to be recognized according to the output result comprises:
   calculating a target gesture center point according to the gesture center point, and the offset of the gesture center point; and
   calculating the position of the bounding box according to the target gesture center point and the length and the width of the bounding box, wherein calculating the position of the bounding box comprises: calculating coordinates of four corners of the bounding box, or calculating coordinates of lower left corner and upper right corner of the bounding box.

2. The method of claim 1, wherein the gesture recognition model further comprises a feature extracting sub-model that is configured to perform feature extraction on the target image to obtain a feature map, and input the feature map to the three sub-models; and
   the feature extracting sub-model is connected with the first sub-model, the second sub-model and the third sub-model, and the first sub-model, the second sub-model and the third sub-model are not connected to each other.

3. The method of claim 2, further comprising, after the feature map is inputted to the first sub-model,
   processing the feature map using the first sub-model to obtain heatmaps each corresponding to a gesture category;
   performing pooling processing on each of the heatmaps to obtain a first preset number of top ranked peaks in each of the heatmaps, determining a maximum peak based on the first preset number of top ranked peaks in each of the heatmaps, identifying a gesture category corresponding to one of the heatmaps where a position corresponding to the maximum peak is located as a recognized gesture category, and identifying the position corresponding to the maximum peak as the gesture center point.

4. The method of claim 2, wherein the feature extracting sub-model is implemented using a lightweight network.

5. The method of claim 1, further comprising training the gesture recognition model by a supervised training, which comprises:
   obtaining a training data set that comprises training images containing gestures and labels corresponding to the gestures in the training images and configured to determine desired outputs of the gesture recognition model, wherein each of the labels comprises a gesture category and coordinates of a bounding box;
   inputting the training images to the gesture recognition model, obtaining actual outputs of the three sub-models of the gesture recognition model, and calculating a loss value according to the actual outputs and the desired outputs using a loss function; and
   updating a weight in the gesture recognition model according to the loss value using a back propagation algorithm so as to reduce the loss value until convergence is reached.

6. The method of claim 1, wherein acquiring the target image containing the gesture to be recognized comprises:
   obtaining an original RGB image containing the gesture to be recognized using a camera; and
   preprocessing the original RGB image to obtain the target image of a preset size, wherein the original RGB image is preprocessed by an affine transformation under premise of maintaining flatness of the original RGB image.

7. A gesture recognition device, comprising:
   one or more processors;
   a memory; and
   one or more programs, wherein the one or more programs are stored in the memory and configured to be executed by the one or more processors, the one or more programs comprise:
   instructions for acquiring a target image containing a gesture to be recognized;
   instructions for inputting the target image to a gesture recognition model that comprises a first sub-model, a second sub-model, and a third sub-model that are in a parallel relationship, the first sub-model configured to determine a gesture category and a gesture center point, the second sub-model configured to determine an offset of the gesture center point, and the third sub-model configured to determine a length and a width of a bounding box for the gesture to be recognized, wherein the offset of the gesture center point is caused by the gesture recognition model processing the target image, and wherein the target image is inputted to the first sub-model, the second sub-model and the third sub-model, and the first sub-model, the second sub-model and the third sub-model process the target image in parallel;
   instructions for acquiring an output result from the gesture recognition model, wherein the output result comprises the gesture category, the gesture center point, and the offset of the gesture center point, and the length and the width of the bounding box; and
   instructions for determining the gesture category and a position of the bounding box of the gesture to be recognized according to the output result;

wherein the instructions for determining the gesture category and the position of the bounding box of the gesture to be recognized according to the output result comprise:
  instructions for calculating a target gesture center point according to the gesture center point, and the offset of the gesture center point; and
  instructions for calculating the position of the bounding box according to the target gesture center point and the length and the width of the bounding box.

8. The device of claim 7, wherein the gesture recognition model further comprises a feature extracting sub-model that is configured to perform feature extraction on the target image to obtain a feature map, and input the feature map to the three sub-models.

9. The device of claim 8, wherein after the feature map is inputted to the first sub-model, the first sub-model is configured to:
  process the feature map using the first sub-model to obtain heatmaps each corresponding to a gesture category;
  perform pooling processing on each of the heatmaps to obtain a first preset number of top ranked peaks in each of the heatmaps, determine a maximum peak based on the first preset number of top ranked peaks in each of the heatmaps, identify a gesture category corresponding to one of the heatmaps where a position corresponding to the maximum peak is located as a recognized gesture category, and identify the position corresponding to the maximum peak as the gesture center point.

10. The device of claim 8, wherein the feature extracting sub-model is implemented using a lightweight network.

11. The device of claim 7, wherein the one or more programs further comprise instructions for training the gesture recognition model, which comprise:
  instructions for obtaining a training data set that comprises training images containing gestures and labels corresponding to the gestures in the training images and configured to determine desired outputs of the gesture recognition model, wherein each of the labels comprises a gesture category and coordinates of a bounding box;
  instructions for inputting the training images to the gesture recognition model, obtaining actual outputs of the three sub-models of the gesture recognition model, and calculating a loss value according to the actual outputs and the desired outputs using a loss function; and
  instructions for updating a weight in the gesture recognition model according to the loss value using a back propagation algorithm so as to reduce the loss value until convergence is reached.

12. The device of claim 7, wherein the instructions for acquiring the target image containing the gesture to be recognized comprise:
  instructions for obtaining an original RGB image containing the gesture to be recognized using a camera; and
  instructions for preprocessing the original RGB image to obtain the target image of a preset size.

13. A non-transitory computer-readable storage medium storing one or more programs to be executed in a gesture recognition device, the one or more programs, when being executed by one or more processors of the gesture recognition device, causing the gesture recognition device to perform processing comprising:
  acquiring a target image containing a gesture to be recognized;
  inputting the target image to a gesture recognition model that comprises a first sub-model, a second sub-model, and a third sub-model that are in a parallel relationship, the first sub-model configured to determine a gesture category and a gesture center point, the second sub-model configured to determine an offset of the gesture center point, and the third sub-model configured to determine a length and a width of a bounding box for the gesture to be recognized, wherein the offset of the gesture center point is caused by the gesture recognition model processing the target image, and wherein the target image is inputted to the first sub-model, the second sub-model and the third sub-model, and the first sub-model, the second sub-model and the third sub-model process the target image in parallel;
  acquiring an output result from the gesture recognition model, wherein the output result comprises the gesture category, the gesture center point, and the offset of the gesture center point, and the length and the width of the bounding box; and
  determining the gesture category and a position of the bounding box of the gesture to be recognized according to the output result;
  wherein determining the gesture category and the position of the bounding box of the gesture to be recognized according to the output result comprises:
    calculating a target gesture center point according to the gesture center point, and the offset of the gesture center point; and
    calculating the position of the bounding box according to the target gesture center point and the length and the width of the bounding box.

14. The non-transitory computer-readable storage medium of claim 13, wherein the gesture recognition model further comprises a feature extracting sub-model that is configured to perform feature extraction on the target image to obtain a feature map, and input the feature map to the three sub-models.

15. The non-transitory computer-readable storage medium of claim 14, wherein after the feature map is inputted to the first sub-model, the first sub-model is configured to:
  process the feature map using the first sub-model to obtain heatmaps each corresponding to a gesture category;
  perform pooling processing on each of the heatmaps to obtain a first preset number of top ranked peaks in each of the heatmaps, determine a maximum peak based on the first preset number of top ranked peaks in each of the heatmaps, identify a gesture category corresponding to one of the heatmaps where a position corresponding to the maximum peak is located as a recognized gesture category, and identify the position corresponding to the maximum peak as the gesture center point.

16. The non-transitory computer-readable storage medium of claim 13, wherein the one or more programs, when being executed by one or more processors of the gesture recognition device, cause the gesture recognition device to perform processing comprising training the gesture recognition model, which comprises:
  obtaining a training data set that comprises training images containing gestures and labels corresponding to the gestures in the training images and configured to determine desired outputs of the gesture recognition model, wherein each of the labels comprises a gesture category and coordinates of a bounding box;

inputting the training images to the gesture recognition model, obtaining actual outputs of the three sub-models of the gesture recognition model, and calculating a loss value according to the actual outputs and the desired outputs using a loss function; and updating a weight in the gesture recognition model according to the loss value using a back propagation algorithm so as to reduce the loss value until convergence is reached.

17. The non-transitory computer-readable storage medium of claim 13, wherein acquiring the target image containing the gesture to be recognized comprises:

obtaining an original RGB image containing the gesture to be recognized using a camera; and preprocessing the original RGB image to obtain the target image of a preset size.

* * * * *